Dec. 8, 1964    C. D. PETERSON    3,160,169
CHECK VALVE UNIT FOR A DIAPHRAGM TYPE PRESSURE REGULATOR
Filed July 17, 1961    2 Sheets-Sheet 1

INVENTOR
CHARLES D. PETERSON
BY Fred E. Shoemaker
Fred L. Witherspoon Jr.
ATTORNEYS Dec. 8, 1964     C. D. PETERSON     3,160,169
CHECK VALVE UNIT FOR A DIAPHRAGM TYPE PRESSURE REGULATOR
Filed July 17, 1961     2 Sheets-Sheet 2

INVENTOR
CHARLES D. PETERSON
BY Fred E. Shoemaker
Fred L. Witherspoon Jr.
ATTORNEYS

United States Patent Office 3,160,169
Patented Dec. 8, 1964

3,160,169
CHECK VALVE UNIT FOR A DIAPHRAGM
TYPE PRESSURE REGULATOR
Charles D. Peterson, Dallas, Tex., assignor to Universal Controls Corporation, Dallas, Tex., a corporation of Texas
Filed July 17, 1961, Ser. No. 124,703
4 Claims. (Cl. 137—315)

This invention relates to a gas pressure regulator and more particularly to such a regulator intended primarily for domestic service and having a number of characteristics leading to improved performance.

It is a general object of the present invention to provide a novel and improved gas pressure regulator and more particularly such a regulator equipped with a relief valve.

An important object of the invention resides in the provision of a simple and unique relief valve mounted in the spring casing of the regulator.

Important features of the invention reside in the following:

Provision of simple mounting and holding means for the check valve;

Unique construction and assembly of the relief check valve.

Other and further objects and features of this invention will be more apparent to those skilled in the art upon a consideration of the following specification and the accompanying drawings, wherein is disclosed a single illustrative embodiment of the invention, with the understanding that such changes and modifications may be made therein as fall within the scope of the appended claims without departing from the spirit of the invention.

The present day enormous increase in the demand for gas for domestic uses, including house heating, air conditioning, cooking, clothes-drying and the like, together with the increased main and distributor pressures required to handle this demand, has imposed critical requirements on domestic gas pressure regulators which cannot always be satisfactorily met by types of regulators available at costs satisfactory to gas distributing companies. The presence in one household of several large-demand gas-consuming devices, automatically controlled, assures likelihood of several being in operation simultaneously, making mandatory increase volume handling capacity without changing size or complication of the regulator. Moreover, the wide distribution of the consuming devices throughout the house demands a better holding of the desired outlet pressure with increased demand, and it goes without saying that low cost is essential.

Figure 1:
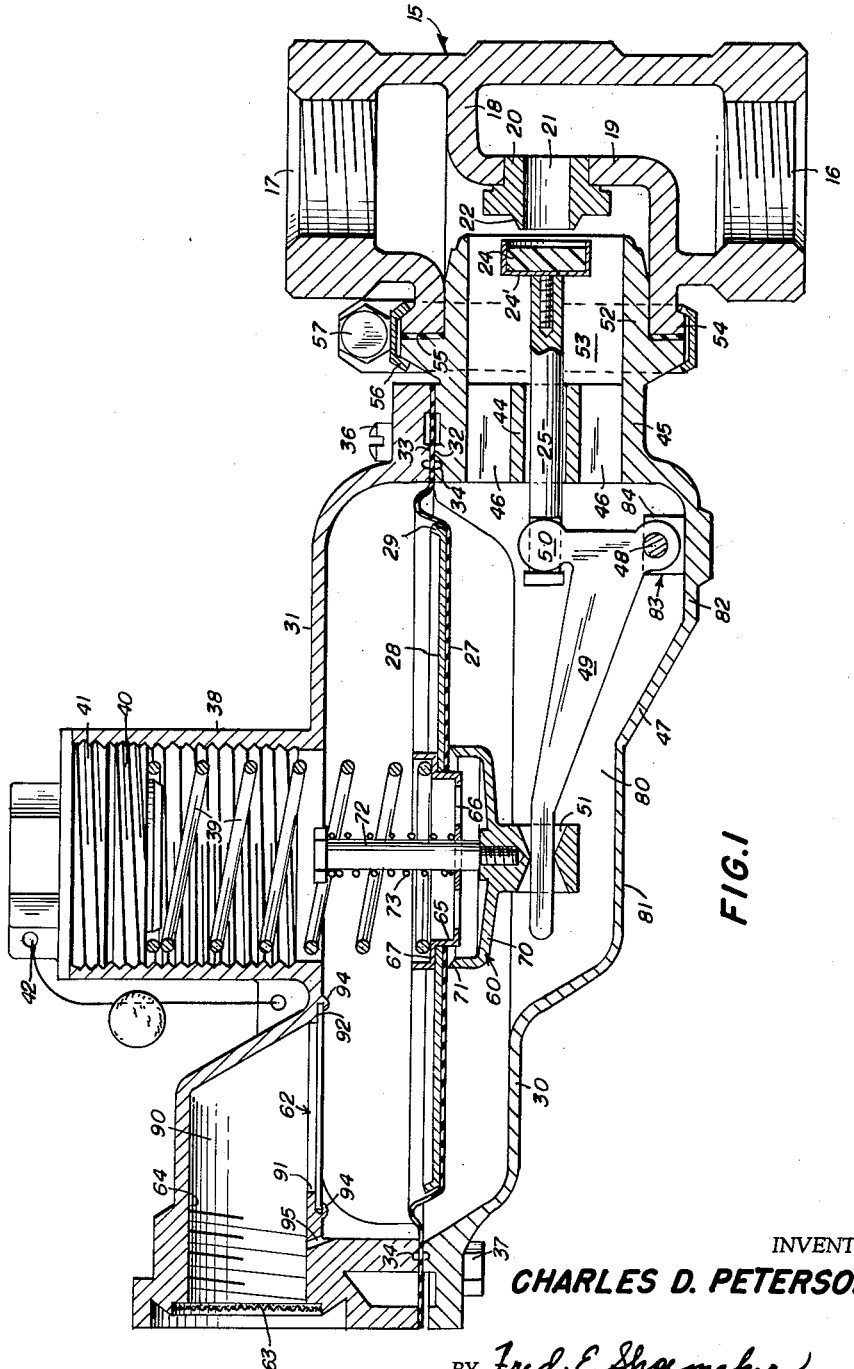
FIGURE 1 is an axial section through the diaphragm housing and the valve body of a gas pressure regulator with booster action constructed according to my new invention.
Figure 2:
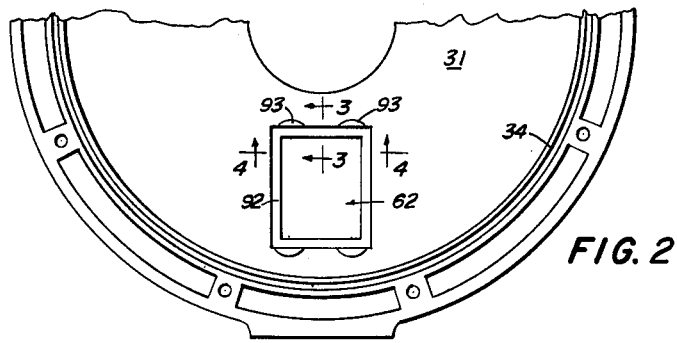
FIGURE 2 is a fragmentary bottom plan view of the diaphragm upper casing and spring housing showing the check valve positioned therein.

Referring now to the drawings for full understanding of the invention, there is illustrated in FIGURE 1 the general layout of the improved gas pressure regulator having a valve body 15 with inlet port 16 and oppositely disposed outlet port 17, each usually threaded, as shown, for connection to distribution pipes. The passageway between inlet and outlet ports 16 and 17 is closed off by a Z-shaped septum 18 having an intermediate flat section 19 through which is fitted a nonferrous seat unit 20 incorporating a gas passage or choke bore 21 whose outlet end is surrounded by the frusto-conical seat 22 having a sharp seating edge. A valve disc 24 mounted on the end of a slidable valve stem 25 is adjustable toward and from said seat 22 to regulate the rate of flow of gas in accordance with demand and under control of pressure changes at the outlet side of the passage 21.

Control of the position of the valve disc 24 in respect to the seat 22 is effected by means of a flexible diaphragm 27 preferably having its central area in contact with a flat diaphragm plate 28 having upturned edges 29. This diaphragm is mounted between the two parts of a diaphragm housing or case including lower portion 30 and upper portion 31, each of appropriate diameter and having confronting flat borders 32 and 33 respectively of suitable width to clamp between them the soft flexible peripheral area of the diaphragm to provide a gas-tight chamber within which the diaphragm operates. Circumferential grooves 34 in the confronting borders facilitate keeping the joint gas tight. The two halves of the case are secured together over the diaphragm periphery by means of screws 36 extending through their borders and receiving nuts 37 on the lower side which are prevented from rotating by engagement with integral stoplugs not shown.

An axially extending integral spring tube 38 projects outwardly from the upper case center and is internally threaded for receiving the adjusting nut 40 to regulate the helical diaphragm spring 39. Access to the nut is normally prevented by closure cap 41 which can be wired or sealed through aperture 42 to prevent tampering. The spring bears at one end on adjusting nut 40 and at the lower end onto the diaphragm plate 28 tending to force the diaphragm downwardly to exert opening force on the valve disc. For this purpose the stem of the valve disc is slidably mounted in sleeve 44 centrally supported in tube 45, cast integral with the lower case, by web 46 integral with the two parts. The stem 25 of the valve disc is slidable in and guided by the sleeve 44. Within the deep portion of channel 47, of the lower casing, which merges the tube 45 with the remainder of the lower case which is of less depth than tube and channel, is mounted fulcrum rod 48 for bell crank lever 49, the short arm of which has rounded end 50 closely received in a side slot at the inner end of the valve stem to actuate the latter. The long arm of the lever has a reduced straight end received in an hourglass-shaped opening 51 in a stud attached for movement with the diaphragm and its disc, whereby the expansion action of the spring tends to lift the valve disc 24 to a maximum from its seat.

The tube 45, through which the valve stem 25 passes, is formed integral with and radial to the lower case of the diaphragm housing and has reduced circular end 52 which fits closely in a bore in the lateral extension 53, from the valve body 15 which is coaxial with the valve seat insert therein. A flange 54 adjacent this end and facing to the right, cooperates with a corresponding flange 54 at the left end of part 53 to clamp a gasket 55 therebetween when they are secured together by the encircling band 56 of channel shape, the outturned ends of which are drawn together by a clamp bolt and nut 57 for a secure and gas-tight fit.

The regulator is equipped to handle emergencies of various types, primarily the presence of foreign bodies which prevent closing of the valve disc 24 against the seat under some circumstances. If no consuming devices are connected to the outlet 17, i.e., because their valves are closed, and valve disc 24 is prevented from seating, the full high pressure of the gas main builds up in outlet 17 and can, for instance, blow out pilot lights, or result in other difficulties if a relatively small consumption device is turned on and ignited, since the pressure may now be 10 to 20 times that desired for the opration of such devices and safe for their use. Under these circumstances, the pressure beneath the diaphragm builds up and endeavors to close the valve disc against the seat. Means is therefore provided to vent this excess pressure to the exterior by permitting it to pass through the diaphragm at the central valve arrangement therein, illustrated at 60, whereby the gas has access to the upper case 31 from which it is permitted to escape through a check or flap valve 62 and out through the screened vent 63 to the atmosphere if the regulator is mounted outdoors. In the case of an indoor mounting, screen 63 is removed and a vent pipe threaded into opening 64.

The arrangement of valve 60 is as follows. The diaphragm and its plate 28 are provided with a large circular central opening into which is fitted the reduced diameter 65 of the main spring seat, in the form of a two diameter cup. The bottom of the cup is provided with large perforations 66 and an annular area 67 is provided between the two diameters on which the main spring 39 seats to apply pressure to the diaphragm plate 28 and tend to force it downwardly.

To close the apertures 66 in the cup bottom, a relief valve, in the form of a cup 70 integral with the stud having the hourglass opening 51, has a sharpened upper edge 71 which seats against the resilient diaphragm normally closing the passages 66. It is fitted with a post 72, projecting upwardly therefrom and headed at the upper end to form a stop for the surrounding secondary spring 73, the lower end of which bears on the center of cup 65 to hold the relief valve cup 70 resiliently seated against the diaphragm.

It will be apparent that if valve disc 24 is prevented from closing against its seat when gas pressure increases unduly beneath the diaphragm, then movement of lever 49 is terminated and the pressure beneath the diaphragm lifts it away from cup valve 70 so that gas escapes through passages 66 into the upper case, lifts flap valve 62 and escapes to the atmosphere. Any obstruction preventing closure of valve disc 24 can be readily cleared by a repairman, after shutting off the gas, by releasing clamp 56 so that the diaphragm case and its stem 52 can be withdrawn for access to the valve disc and to the seat.

The check valve 62 leading and opening from the interior of the upper case 31 permits discharge from the upper case and also serves to prevent pulsations during the operation of the regulator. Thus, if a valve to a large gas consumer opens suddenly, the sudden reduction of pressure beneath the diaphragm would tend to open valve 22, 24 too rapidly and cause a sudden increase in pressure beyond that desired, but since the check valve 62 is closed, a reduction in pressure in the upper case partially resists downward movement of the diaphragm permitting quick return to normal operation. On the other hand, when conditions call for closing the valve 24 onto its seat, as when a large consumption of gas is suddenly shut off, the valve is caused to close as rapidly as the pressure builds up beneath the diaphragm since its upward movement immediately opens check valve 62 to permit this action.

Figure 3:
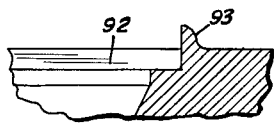
FIGURE 3 is a radial section taken on line 3—3 of FIGURE 2 illustrating the mounting seat for the check valve assembly.
Figure 4:
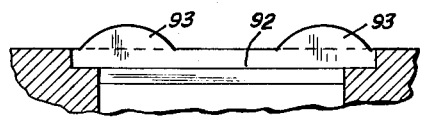
FIGURE 4 is a view in partial section taken on line 4—4 of FIGURE 2.
Figure 5:
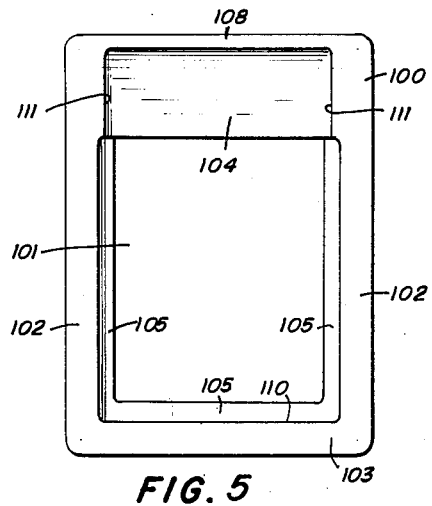
FIGURE 5 is top plan view of the check valve frame and seat unit.
Figure 6:
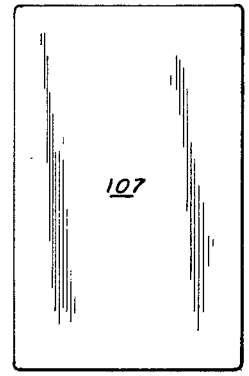
FIGURE 6 is plan view of the check valve flapper.
Figure 7:
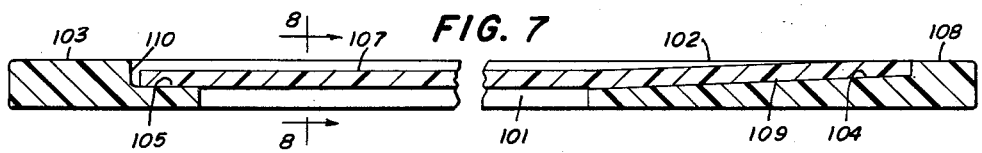
FIGURE 7 is a longitudinal, vertical central section through the assembled check valve seat unit and flapper.
Figure 8:
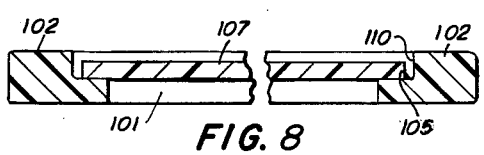
FIGURE 8 is a transverse section through the valve assembly of FIGURE 7 taken on line 8—8 thereof.

FIGURES 2 to 8 inclusive illustrate the construction and mounting of the novel check valve. Referring first to FIGURE 1, it will be seen that this valve fits in a window formed in the flat wall of the upper case beneath the vent chamber 90. The actual opening in this wall is illustrated at 91 and surrounding it is provided a rabbet 92 in the inner wall forming a seating area for the valve frame 100. The valve assembly as seen in FIGURES 7 and 8 comprises only the flat rectangular frame 100 of plastic material and a flapper which assembly is adapted to fit into the rabbet area 92. It is secured therein by appropriate treatment of the upstanding lugs 93 seen in FIGURES 2, 3 and 4 formed from the soft metal of which the upper case is cast, preferably aluminum. These lugs normally stand up as seen in FIGURES 3 and 4 until the valve is positioned after which they are peened down as seen at 94 in FIGURE 1 to overlap the undersurface of the valve frame and hold it rigidly in position. Since it is not the purpose of the valve to ever prevent any atmospheric air entering the upper case, which action would prevent proper return of the diaphragm under the action of its spring the fit of the valve frame into the rabbet is either sufficiently loose to allow slow return of atmosphere after having been vented through the check valve, or a small by-pass opening, shown at 95, is provided for the purpose, and also acts as a water drain.

FIGURES 5 to 8 inclusive illustrate the simple mechanism constituting the check valve 62. Here the frame 100 is seen to be a sheet of plastic of uniform thickness and of the proper shape to be received in the recess or rabbet in the opening in the upper case wall and it has a through opening 101, of rectangular configuration, defined between side walls 102, narrow end wall 103 and wider end wall 104. Walls 102 and 103 are rabbeted as shown at 105 providing a seat for the edges of a valve flapper 107 illustrated as a thin sheet of resilient and flexible plastic material of rectangular configuration as seen in FIGURE 6. The sheet is flat and of a thickness slightly less than the depth of the rabbet 105. The wide wall 104 of the frame is reduced in thickness starting at the edge of the opening 101 when the reduction is the same as formed by the rabbet and tapering toward the rim 108, where the depth is equal to the thickness of the material of the flapper. This provides an upwardly inclined bedding surface 109 against which the underface of the flapper is adhesively secured as illustrated in FIGURE 7. When the flat sheet is bent to make it contact and adhere to the bedding surface 109, it is flexed sufficiently to provide the necessary seating pressure to hold the edges of the flapper closely against the bottom wall of the rabbet 105.

To facilitate assembling and to insure against the edges of the flapper scraping against the outer walls of the rabbet, the width of the flapper is less than that between the vertical walls of opposite rabbets and its length is likewise reduced by the same amount to provide clearances such as seen at 110 in FIGURES 7 and 8. To insure these clearance along the side edges, the inclined bedding surface 109 has its side edges 111 more closely spaced than the side edges of the rabbets and providing a close fit for the width of the flapper 107, whereby, when it is set in and adhesively secured, it automatically provides clearances 110 so that the flapper edges can never contact or be interfered with by the edges of the rabbets. This automatic locating during assembly assures accurate position of the flap without any care on the part of the operator.

The valve just described is extremely simple, formed of only two pieces of plastic, each of which can be molded or cut with a minimum of work. The flexing of the flap provides the necessary contact pressure to insure close fitting to the seat and its resiliency permits wide openings within the confines of the compartment 90 should there be a large flow of gas due to the regulator valve sticking open.

What is claimed as new and desired to be secured by Letters Patent is:

1. A check valve unit for use with an upper diaphragm and spring housing of a gas pressure regulator comprising a wall member formed of malleable cast metal and having a rectangular window therethrough, a rabbet surrounding said window on the inner side thereof, a valve unit adapted to be received in said rabbet to close the window, at least two opposite edges of said rabbet having lugs outstanding from the adjacent metal of the housing and adapted to be crimped over the valve unit to hold it in position, said valve unit including a frame of size and thickness to fill said window rabbet, the four frame sides being each of such width as to project substantially beyond the rabbet into the window area, a flat flapper sheet of less than window size adapted to engage all four frame sides where exposed to said window, means integral with frame and flapper to bias the flapper against said projections of the frame sides, and means securing one end of the flapper to one of said sides permanently.

2. A flat type check valve for closing a window in the upper or spring casing of a diaphragm-type gas pressure regulator comprising in combination, a flat sheet of plastic material of generally rectangular shape sized to close the window, a rectangular opening through said sheet leaving a frame on the sides and ends, one face of said two sides and of one end being rabbeted adjacent said opening to provide a seat for a valve flapper, the remaining frame end having a recess in said face merging with said rabbet and opening, a flapper of flat resilient plastic material sized to enter said recess and seat in said rabbet, said recess increasing in depth toward said opening, one end portion of said flapper being adhesively secured to the bottom wall of said recess whereby to flex the material of the flapper and press its edges into said rabbet for a tight seating.

3. A check valve as defined in claim 2 in which the width of said rabbet measured in the direction of the length of said frame end and the entering portion of said flapper are sized for a close fit and the width and length of the remainder of the flapper are such as to provide clearance between its edges and the outer walls of the rabbet in said two sides and end of said frame.

4. A flat type check valve for closing a window in the upper or spring casing of a diaphragm-type gas pressure regulator comprising in combination, a flat sheet of plastic material of generally rectangular shape sized to close the window, a rectangular opening through said sheet leaving a frame on the sides and ends, one face of said two sides and of one end being rabbeted adjacent said opening to provide a seat for a valve flapper, the remaining frame end having a recess in said face merging with said rabbet and opening, a flapper of resilient plastic material sized to enter said recess and seat in said rabbet, the bottom wall of said recess and said flapper being so configured that when one end of the flapper is secured against said bottom wall the material of the flapper is so flexed as to press its border tightly against the bottom wall of the rabbet to provide a tightly seated valve.

References Cited in the file of this patent
UNITED STATES PATENTS

| | | |
|---|---|---|
| 1,955,733 | Bijur | Apr. 24, 1934 |
| 2,217,380 | Pedder et al. | Oct. 8, 1940 |
| 2,704,550 | Brewer et al. | Mar. 22, 1955 |
| 2,725,075 | Irgens | Nov. 29, 1955 |
| 2,881,795 | Waldenmaier et al. | Apr. 14, 1959 |
| 2,895,501 | Irwin | July 21, 1959 |
| 3,032,054 | Irwin | May 1, 1962 |